G. Coffeen, Jr.
Ice Cream Freezer.
Nº 6,865.          Patented Nov. 13, 1849.
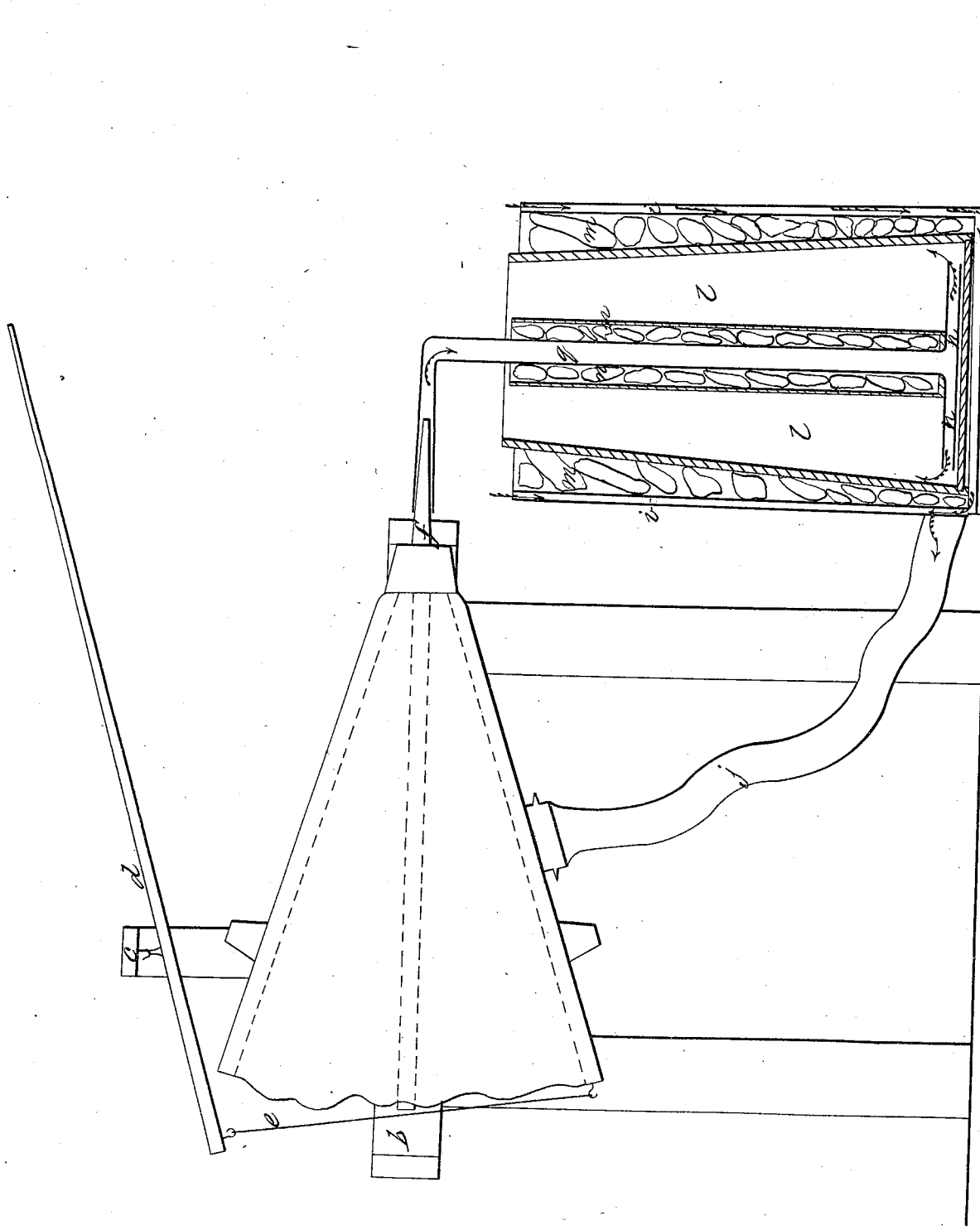

UNITED STATES PATENT OFFICE.

GOLDSMITH COFFEEN, JR., OF WARREN COUNTY, OHIO.

ICE-CREAM FREEZER.

Specification of Letters Patent No. 6,865, dated November 13, 1849.

*To all whom it may concern:*

Be it known that I, GOLDSMITH COFFEEN, Jr., of Warren county, Ohio, have invented new and useful Improvements in Freezers for Making Ice-Cream; and I do hereby declare the following to be a full, clear, and exact description of the same, reference being had to the annexed drawings, making part of this specification, in which a side and partly sectional elevation exhibits a correct delineation of my improvements.

The nature of my invention consists in causing a blast of chilled air to permeate, be diffused through and disturb the liquids and materials of which ice cream is made. I chill the blast by drawing it from the atmosphere into a receptacle which is made to surround the sides and bottom of the vessel containing the ice or refrigerating mass. Within this vessel the can containing the liquids and materials of which the ice cream is to be formed is placed, and the interval between the two packed with ice or the freezing compound. The air may be drawn off at a central opening in the bottom of the air chamber. A section of elastic hose is fastened in any usual way to the opening and similarly attached at its other end to an ordinary double bellows, mounted on a suitable frame. An air pump, bellows or any other contrivance adapted to the purpose of forcing the chilled blast through the liquids and materials of which ice cream is formed, may be used. In the drawings I have mounted a double acting bellows upon a frame and appended a lever for operating the same from a gallows constructed for that purpose. This lever is attached in the ordinary way to the lower division of bellows. To the nozzle of this bellows I append a tube which passes down through the middle of the ice cream tub and separates into four or more horizontal branches open at their ends at the bottom of the same. Around the upright portion of this tube and of a height equal to that of the ice cream tube there is a cylindrical vessel constructed of which the upright tube thus becomes part and around which the bottom thereof is soldered just above the branches of the tube. This vessel is also well packed with ice or the refrigerating compound used and thus the blast of air as it passes down the tube is a second time brought into contact with the chilled surface. And it will also be readily perceived that the ice or refrigerating compound is also acting during the entire operation by being brought into full contact with the sides of the space holding the liquid, and materials of which the ice cream is to be made both at the center and the periphery of the said space. The chilled air blast being forced through the horizontal branch tubes, bubbles up throughout the whole body of the liquids and materials intended for the ice cream and besides abstracting caloric from them by its own immensely extended contact therewith, it thoroughly disturbs them and brings every portion of the same into continually repeated contact with the refrigerating surfaces due to ice or freezing compound packed in the vessels therefor as described above.

(*a*) is the floor.
(*b*) is the frame supporting the bellows.
(*c*) is the gallows supporting the lever (*d*) that operates the bellows by means of the tank (*e*).
(*f*) is the nozzle of the bellows.
(*g*) is the air tube.
(*h*) are the branches of the same.
(*i*) is the space between the two vessels for the introduction of air to the elastic hose (*j*) from which it is drawn by the bellows.
(*l*) is the vessel holding the liquids and materials of which ice cream is to be made.
(*m*) is the mass of ice or other refrigerating materials, surrounding the same.
(*n*) is the vessel surrounding the air tube (*g*) and filled with ice.

Having thus fully described the nature, construction, and operation of my invention what I claim therein and desire to secure by Letters Patent is—

Freezing cream or other liquids by forcing through them currents of air chilled by passing them through chambers artificially cooled substantially as set forth.

G. COFFEEN, JR.

Attest:
THOS. G. CLINTON,
H. CLAY FREEMAN.